United States Patent
Beun

(10) Patent No.: US 7,376,249 B2
(45) Date of Patent: May 20, 2008

(54) DETERMINATION OF A MOTION OF A BACKGROUND IN A SERIES OF IMAGES

(75) Inventor: Robbie Daniël Pieter Beun, Eb Leiden (NL)

(73) Assignee: Nederlandse Organisatie Voortoegepast-Natuurwetenschappeljk, Onderzoek TNO, Delft (NL)

( * ) Notice: Subject to any disclaimer, the term of this patent is extended or adjusted under 35 U.S.C. 154(b) by 749 days.

(21) Appl. No.: 10/495,684

(22) PCT Filed: Nov. 14, 2002

(86) PCT No.: PCT/NL02/00734

§ 371 (c)(1),
(2), (4) Date: Sep. 2, 2004

(87) PCT Pub. No.: WO03/043348

PCT Pub. Date: May 22, 2003

(65) Prior Publication Data

US 2005/0013466 A1    Jan. 20, 2005

(30) Foreign Application Priority Data

Nov. 14, 2001    (NL) .................................... 1019365

(51) Int. Cl.
*G06K 9/00* (2006.01)

(52) U.S. Cl. ...................... 382/107; 382/284; 382/222; 382/305; 348/222.1; 348/207.2; 348/699; 345/629

(58) Field of Classification Search ................ 382/284, 382/222, 305, 218; 348/222.1, 207.2, 699; 345/629

See application file for complete search history.

(56) References Cited

U.S. PATENT DOCUMENTS

| 6,005,639 | A  | * | 12/1999 | Thomas et al. ............. 348/699 |
| 6,205,260 | B1 | * | 3/2001 | Crinon et al. ............... 382/284 |
| 6,249,613 | B1 |   | 6/2001 | Crinon et al. |
| 6,259,828 | B1 | * | 7/2001 | Crinon et al. ............... 382/305 |
| 7,310,104 | B2 | * | 12/2007 | MacInnis et al. ........... 345/629 |

OTHER PUBLICATIONS

Background Masaicking for low bit rate video coding, Dufaux et al , IEEE 1996.*
Model Based 2D& 3D Dominant Estimation for Mosaicing and Video Representation, IEEE 1995.*

(Continued)

*Primary Examiner*—Andrew W. Johns
*Assistant Examiner*—Nancy Bitar
(74) *Attorney, Agent, or Firm*—Leydig, Voit & Mayer Ltd.

(57) ABSTRACT

The movement of an imaging of a background in a sequence of images of a scene determined. A combination image is composed with pixels which have been built up through combination of several consecutive images. Along with the combination image, a change image is calculated which indicates position-dependently to what extent differences arise between successive images contributing to the same area in the combination image. Corresponding areas in an input image and in the combination image are searched for. This is done depending on the change image, such that a probability that an area in the combination image is found is less according as the change image indicates that the changeability of the are is greater, for instance by selecting, for the purpose of the search, for what areas in the combination image corresponding areas in the input image will be searched for. From the locations of the corresponding areas, the movement of the background is determined.

18 Claims, 4 Drawing Sheets

OTHER PUBLICATIONS

Dufaux et al., "Background Mosaicking for Low Bit Rate Video Coding," *Digital Equipment Corp. & Signal Processing Lab.*, XP 010202155A (1996).

Sawhney et al., "Model-based 2D & 3D Dominant Motion Estimation for Mosaicing and Video Representation," *Machine Vision Group & Signal Processing Lab.*, XP 010147046A (1995).

* cited by examiner

DETERMINATION OF A MOTION OF A BACKGROUND IN A SERIES OF IMAGES

FIELD OF THE TECHNOLOGY

The invention relates to a method and apparatus for determining a movement of a background in a sequence of images. Such a movement comprises, for instance, a translation and/or a rotation of the background. The invention relates in particular to a method for determining a movement of an imaging of a background in a sequence of images of a scene, which method comprises the steps of storing position dependent image information coming from images from a part of the sequence;

selecting a correspondence between a first and second area from, respectively, an input image from the sequence and the image information, on the ground of agreement of an image content in the areas involved;

determining the movement from locations of the first and second area in, respectively, the input image and the image information.

BACKGROUND OF THE INVENTION

In recording a sequence of images of a scene, there often occur movements of a camera relative to the scene (for instance translations and/or rotations). Consequently, the place where objects and a background of these objects are imaged in consecutive images will change from image to image.

For various applications, it is necessary to determine these movements. An example of such an application is the elimination of the effect of shaking movements of the camera. This requires determination of the magnitude of the shaking movements. It can be determined, for instance, from the movement of the background of the scene in the image.

U.S. Pat. No. 6,005,639 discloses a technique for determining the movement of the background and objects from one image to the next image in a video signal. To that end, a measure is calculated for the difference between the image content of possibly corresponding areas in successive images, whilst the locations of the areas in the different images differ from each other by a displacement. A displacement leading to a minimum value of the measure for the difference is utilized as displacement vector of the object or the background imaged in the areas.

Movements of objects relative to the background lead to a problem in this technique. This is because as a result of such movements, in each case parts of the background in the images are covered or, conversely, appear. Such movements can be the result of "real" movements of objects and of apparent movements resulting from perspective effects in camera movements.

U.S. Pat. No. 6,005,639 solves this problem by making use of four consecutive images and a series of uniformly displaced areas in those images. That is, the difference in the location of the areas in immediately consecutive images in each case corresponds with the same displacement vector. If the image content of the areas in all these areas differs minimally, the displacement vector is used as displacement vector of the object or the background. A different case is that the image content differs minimally between areas from a few images in the sequence, but differs much more from areas from one or more other images of the sequence. In this case, the image content is apparently covered in the one or more other images, but the displacement vector can nonetheless be used as displacement vector of the object or the background.

Thus, the effect of coverage of the background is controlled. However, this is done under the assumption that the background and the objects move uniformly. This assumption does not always apply to shaking movements. Also, this assumption limits the length of the sequence of images on which the technique of U.S. Pat. No. 6,005,639 is usable. U.S. Pat. No. 6,005,639 utilizes four consecutive images. A much greater number is not usable because of the risk of non-uniform movements, and also because of the large memory occupation needed for this. Consequently, the technique described is not suitable for images in which more prolonged coverage occurs.

SUMMARY OF THE INVENTION

It is one object of the invention to provide a method and apparatus for determining a movement of a background in images of a scene, while the method and the apparatus continue to operate reliably upon temporary coverage of the background and without a memory for a sequence of several images being necessary. The method according to the invention is characterized in that the method comprises the steps of composing a combination image with pixels built up through combination of several images of the sequence;

determining a change image which indicates position-dependently to what extent there are differences between the image content of pixels from the sequence of images contributing to the same pixel in the combination image;

wherein selecting the correspondence is carried out depending on the change image, such that a probability that a candidate area is selected as second area in the correspondence is made less according as the change image indicates that the changeability of pixels in that candidate area is greater.

A sequence of several images is thus combined to form a collective combination image and that combination image is supplemented with a change image which indicates position-dependently to what extent areas from the sequence of images differ that contribute to the same area in the combination image (this can be done in the change image per pixel or per group of pixels, or, for instance, per area). In this context, "image" is understood to mean any form of position-dependent information, regardless of the position range or the resolution. The combination image and the change image generally extend further than images from the sequence of images.

The change image is used in searching for corresponding areas in the combination image and an input image from the sequence of images. In doing so, second areas in the combination image are not used if they are changeable to a high degree.

Thus, when using a camera that moves relative to the imaged scene, it is ensured that for the movement determination, preference is given to areas whose content is an imaging of the background. Upon displacement of the camera, the imaging of objects from the foreground will move relatively faster than the background. This leads to a high changeability of areas where the foreground objects are imaged. As a result, by virtue of the invention, use of these areas will be made less probable.

The limitation of the second areas, which are used in the correspondence for movement determination, to areas of low changeability can be carried out in different ways. In a first embodiment, it is pre-selected for what areas from the combination image corresponding areas in the input image will be searched for. The selection of the areas from the input image is done with a criterion which, depending on the content of the change image, will or will not select a same area in the combination image when changeability of that area, according to the change image for that area, is below or above, respectively, a threshold value. (Incidentally, the threshold value does not need to be calculated explicitly: it can arise de facto from a comparison with the properties of other areas in the combination image.) In the choice of the areas, the criterion's weighing can include the changeability alone, but other factors may carry weight as well, such as the contrast in the areas involved, the distance to areas that were visible in a preceding image, and so forth. Thus, depending on such factors, the threshold value of the changeability that indicates the difference between selecting or not can differ per area.

In another embodiment, the changeability can carry weight, for instance, in the determination of what agreement between areas corresponds to a minimal difference in image content, so that, for instance, a correspondence between a particular first and second area is regarded as minimal, or not, when changeability of the second area, according to the change image for that image, is below, or above, a threshold value. (Here, too, the threshold value does not need to be explicit.)

Preferably, the determination of the movement is carried out in several steps, first a rough step in which provisional second areas from the combination image are matched with areas from the input image, followed by a refining step, in which definitive second areas from the combination image are matched with areas from the input image. In the refining step, then, only areas from the combination image are used which upon a movement following from the rough step do not deviate too much from the input image.

The combination image is preferably updated each time on the basis of the input image such as it is imaged on the combination image as a result of the movement. Preferably, the combination image is position-dependently updated less strongly according as the change image indicates that the combination image is locally less changeable. This prevents the combination image being strongly disturbed due to temporary coverage of the background.

These and other objectives and advantages of the method and the apparatus according to the invention will be further described with reference to the following figures.

DETAILED DESCRIPTION OF THE DRAWINGS

Figure 1:
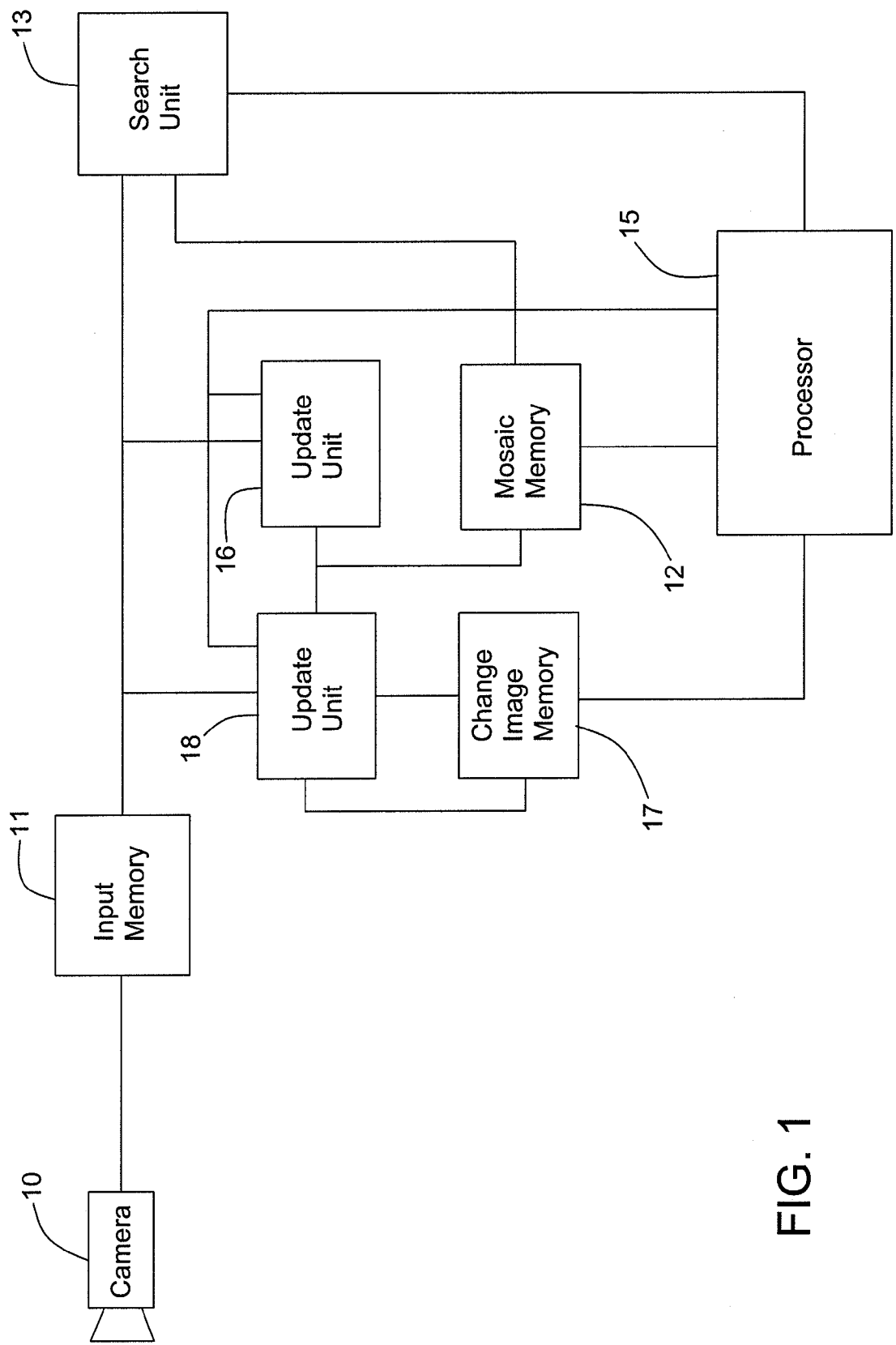
FIG. 1 shows an image processing apparatus

FIG. 1 shows an image processing apparatus. The apparatus includes a camera 10, an input memory 11, a mosaic memory 12, a search unit 13, a score memory 14, a processor 15, a mosaic update unit 16, a change image memory 17 and a change image update unit 18.

Although the apparatus is shown as being divided into functional units, it will be clear that in practice different functional units, such as the processor 15, the search unit 13 and the update units 16, 18 can also be realized to a greater or lesser extent with the same hardware, programmed with different programs. Also, the different memories 11, 12, 17 can in part or all be realized in different areas of a single larger memory.

Figure 2:
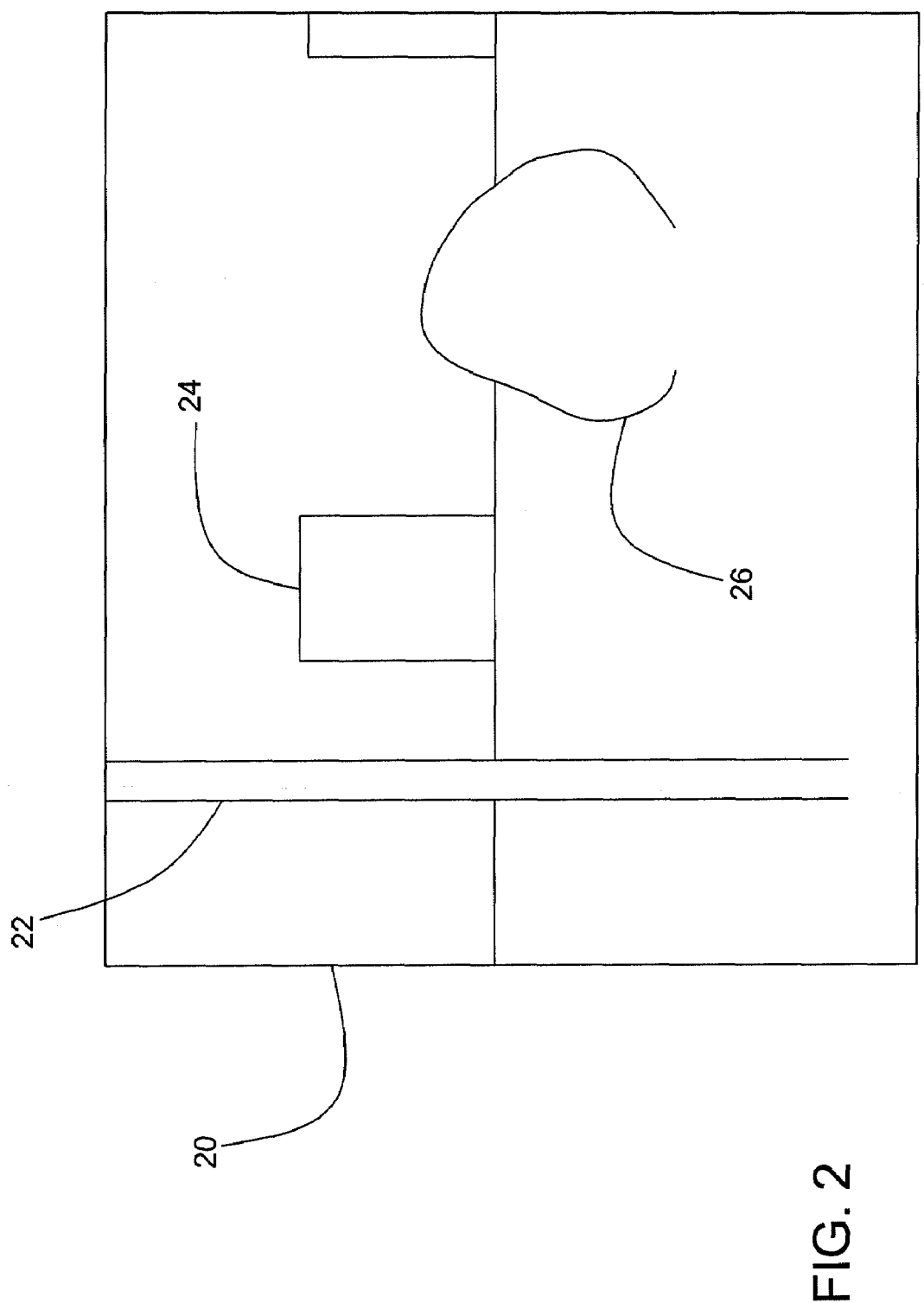
FIG. 2 shows an input image
Figure 3:
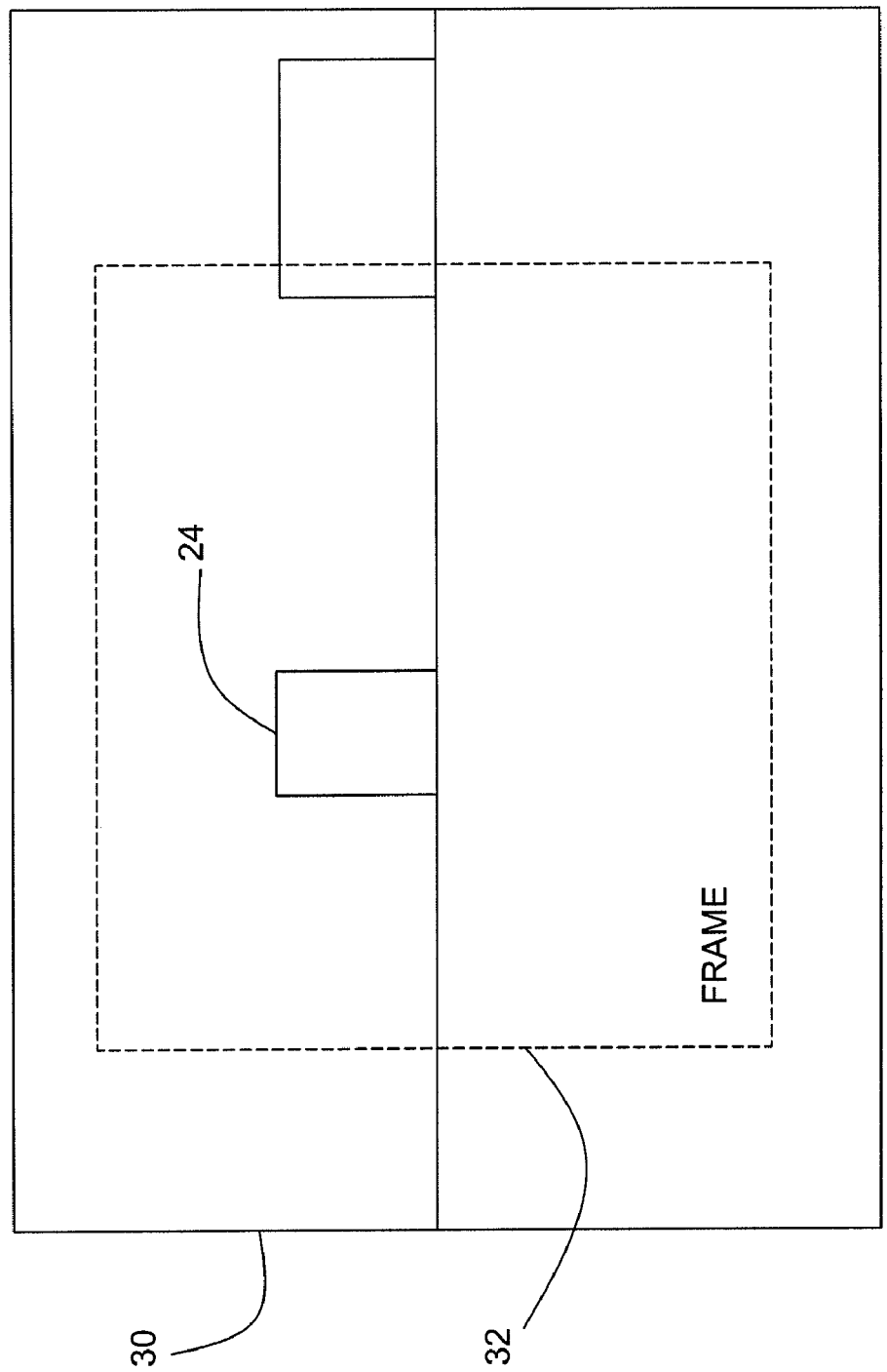
FIG. 3 shows a mosaic image

FIG. 2 shows an example of an input image 20 of camera 10. Such an image contains, for instance, 720×576 pixels. FIG. 3 shows an example of a mosaic image 30 in mosaic memory 12. The mosaic image 30 is generally more comprehensive than the input image (for instance four times as large, 1440×1152 pixels), but does not contain, or contains to a lesser extent, imagings of objects 22, 26 that move relative to a background 24. By way of illustration, a frame 32 corresponding to the circumference of the input image 20 is represented in the mosaic image 30. Absent from the frame are a shrub 26 and a post 22 situated in the foreground and which upon uniform displacement of the camera 10 do not come into the picture at a fixed position relative to the background.

The camera 10 has an output coupled to an input of the input memory 11 for storing input images 20, recorded by the camera, in the input memory 11. The input memory 11 and the mosaic memory 12 have an output coupled to inputs of the search unit 13, for the purpose of supplying image information from the input memory 11 and the mosaic memory 12 to the search unit 13.

The processor 15 has outputs coupled to the input memory 11 and the mosaic memory 12 to control what areas from the mosaic memory 12 are transmitted to the search unit 13. The processor 15 has an input coupled to the change image memory 17, for receiving information from a change image. The processor 15 is arranged to control the choice of the second areas on the basis of the information from the change image.

From the mosaic memory 12, the image information from an area from a mosaic image 30 as selected by the processor 15 is supplied to the search unit. The search unit 13 is arranged to search the input image 20 from the image memory 11 for a corresponding area whose content matches the supplied area from the mosaic image 30 as best as possible. The search unit 13 has an output coupled to the processor 15 to pass the location of the area found in the input image to the processor 15. The processor has outputs coupled to control inputs of the update units 16, 18.

The update units 16, 18 have inputs coupled to the input memory 11 and to the mosaic memory 12 and the change image memory 17. The update units 16, 18 have outputs coupled to the mosaic memory 12 and the change image memory 17.

Figure 4:
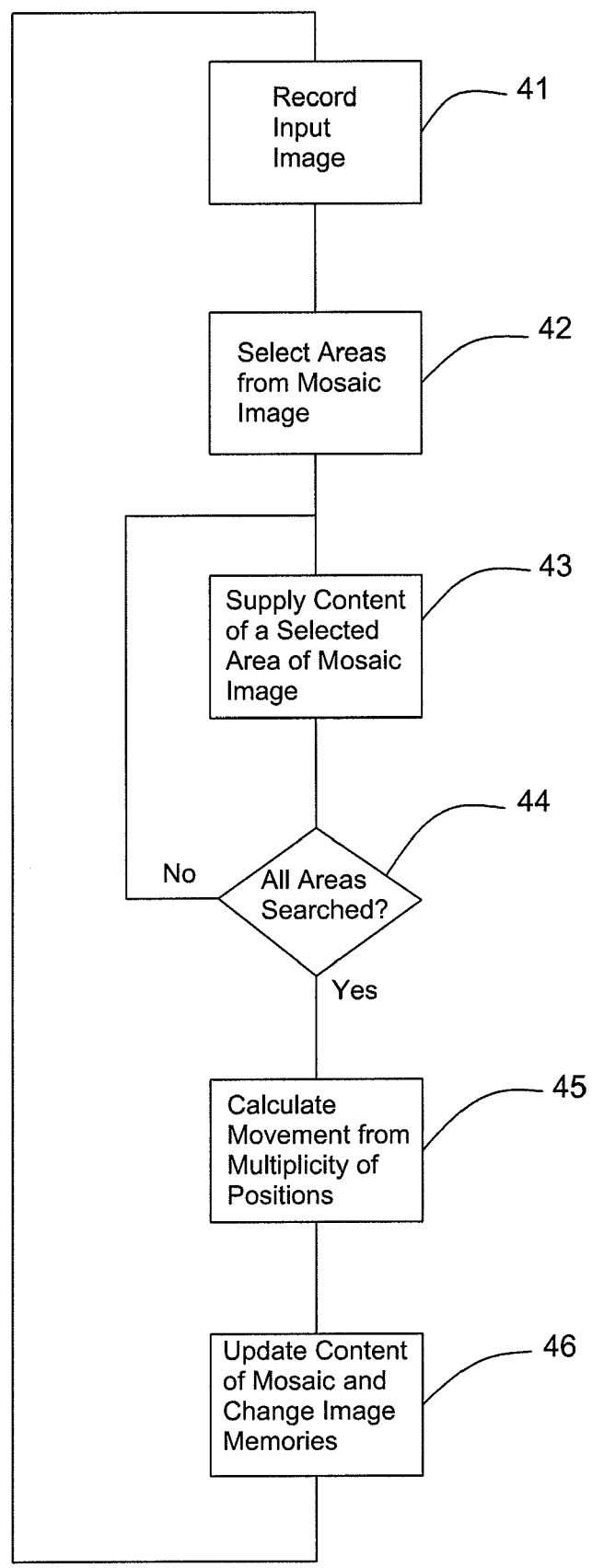
FIG. 4 shows a flow-chart of a method according to the invention

FIG. 4 shows a flow chart to describe the operation of the apparatus of FIG. 1. In a first step 41, the camera 10 records an input image 20 which is stored in input memory 11. In a second step 42, processor 15 selects a number of areas from a mosaic image 30 which is stored in mosaic memory 12. An example of an area is a rectangular area of 32×32 pixels.

In a third step 43, processor 15 causes mosaic memory 12 to supply the content of a selected area of the mosaic image 30 from the mosaic memory 12 to search unit 13. The search unit 13 searches for an area from the input image 20 in the input memory 11 whose content best matches that of the selected area from the mosaic image 30.

The invention is not dependent on the technique the search unit 13 uses for the search. All kinds of techniques known per se, such as, for instance, block matching techniques are suitable for this. An option is, for instance, to determine for different candidate areas in the input image a deviation score with respect to the selected area from the mosaic image 30, after which the area having the least deviation is chosen. In principle, it is possible to search for area from all possible locations in the input image 20, or, on the basis of movements of preceding input images relative to the mosaic image 30, for each area from the mosaic image 30 a range of positions in the input image 20 can be predicted, from which the areas for the comparison are selected.

In a fourth step 44, processor 15 checks whether for all selected areas from the mosaic image a matching area from the input image 20 has been searched for, if not, the third step 43 is carried out for a next area. When for all areas from the mosaic image 30 a matching area from the input image 20 has been searched for, a fifth step 45 is carried out.

In the fifth step 45, the processor 15 determines for each of the areas from the mosaic image the position at which the input image 20 would have to be placed over the mosaic image 30 to have the selected area from the input image 20 overlie the area in the mosaic image. From the multiplicity of positions which the processor 15 thus determines for the different areas in the mosaic image, processor 15 proceeds to calculate an overall movement. The movement can contain exclusively a translation (displacement component) or also a rotation component. In principle, from the displacements of each two areas from the input image 20 follows a rotation and a translation, whereas from the displacement of a single area follows only a rotation. Since preferably more than two areas from the mosaic image 30 are used, several translation and/or rotation values can be calculated. Through averaging or by taking a median, or in a different manner, a single translation and/or rotation is determined.

In one embodiment, in the fifth step the processor 15 proceeds to apply a refining step, in which the overall translation and/or rotation found is used to select a number of areas from the mosaic image 30 again, but now limited to those second areas which, at or near the overall translation and/or rotation found differ from the input image 20 by less than a threshold. (Here, too, again, areas with a lower changeability can be selected with priority.) What is thus avoided is that use is made of parts of the background from the mosaic image that are covered in the input image.

Further, the input image 20 in the input memory 11, if necessary, is rotated in accordance with the rotation found. With the new selected areas, the processor, with steps such as the second step 42 and the earlier described part of the fifth step 45, calculates an overall position again, but now more accurately.

In a sixth step 46, processor 15 proceeds to send commands to the update units 16, 18 to update the content of the mosaic memory 12 and the change image memory 18, at the selected overall position. Next, the processor repeats the method from the first step 41 for a next input image 20.

In the second step 42, the processor 15 controls the choice of the areas in the mosaic image 30 on the basis of the content of change image that is stored in the change image memory 17. The change image indicates per pixel or per group of pixels, as a function of the location, to what extent the pixels of different input images 20 which are imaged on the mosaic image at the respective location or group of locations are subject to change between different input images.

According as the changeability of the pixels in an area of the mosaic image 30 is greater, the processor 15 will less readily choose the area in question in the second step 42. Thus, the set of area pairs in which the processor 15 searches for a minimal difference in the fifth step 45 is limited to a set of areas from the mosaic image 30 that have a low changeability. As a result, the reliability of the correspondence found is enhanced and also the needed amount of calculations for determining the differences is limited by looking only at a limited number of areas from the mosaic image 30.

In a first embodiment of the second step 42, the processor 15 first chooses a number of candidate areas uniformly spread across the mosaic image 30. Next, the processor 15 reads for each of the areas from the change image memory 17 how large the extent of changeability of the area in question is. The processor proceeds to choose a predetermined number of areas that are less changeable than all other areas and uses these in the third step 43.

In a further embodiment, the choice of the areas is co-determined by other factors, such as a measure for the contrast in the areas involved, or the distance of the location of the area involved to the part 32 of the mosaic image 30 on which a preceding input image 20 was imaged. For each of these factors, the processor 15 calculates, for instance, a score, and adds this score to the extent of changeability such as it appears from the content of the change image memory 17. Next, in the second step 42, the processor 15 chooses those areas for which the sum score is minimal. The score for the contrast is then lower according as there is more contrast (which renders the areas better suitable for movement detection and moreover indicates that the area in question is in focus), the score for the distance is lower according as the distance is smaller, and the extent of changeability that is added to these scores is greater according as the changeability is greater. Thus, areas from the mosaic image with high contrast (in focus), close to or in the preceding input image and with low changeability are preferred for use in the comparison in the third step 43. Thus, in effect, a threshold value below which the changeability for the area involved must lie to be selected is adjusted on the basis of these factors.

More generally, in the second step 42, the processor 15 utilizes a selection algorithm in which an area from the mosaic image, compared with other areas, has more chance of being selected according as the changeability of the area involved is smaller.

In the sixth step 46, the update units 16, 18 update the content of the mosaic memory and the change image memory. On the basis of the translation and/or rotation found, it is determined what pixel location of the input image is imaged onto what pixel location of the mosaic image (or what combination of pixels is imaged onto a location). At the locations on which the input image was imaged, the mosaic image is updated. For the mosaic image, this is done, for instance, by averaging the input image 20 and the mosaic image 30 with each other, with a particular weighting factor for each of the images (for instance 0.1 for the input image 20 and 0.9 for the mosaic image). In one embodiment, the update unit 16 for the mosaic image selects the weighting factor depending on the content of the change image, by giving the input image 20 less weight in the averaging according as the changeability of the mosaic image 30 at that point is smaller (the weighting factor can, for instance, vary according to a predetermined function, for instance a linear function, of changeability.) Thus, the effect of overwriting of parts of the mosaic image 30 that contain an imaging of the background is made smaller. Conversely, parts of the mosaic image 30 not containing any background (high changeability) are changed faster this way.

The update unit 18 for the change image calculates a difference between the mosaic image 30 and the input image 20 (for instance an absolute value of a difference between pixel values at corresponding pixel locations) and updates the stored changeability on the basis of the calculated difference. This can be done, for instance, by increasing or decreasing the changeability by a fixed amount, depending on detection of whether the difference is below or above a threshold (with the changeability being optionally limited to a range between a predetermined minimum and maximum). Also, determining the changeability by averaging can possibly be done with a weighting factor, so that the old changeability image carries greater weight in the averaging than the newly calculated changeability values. Here, too, the weighting factors can be set depending on the local changeability, so that the old change value carries more weight according as it is smaller.

Although the use of the change image has been described with reference to a specific technique for determining movement of the background, it will be clear that the change image is not limited to this technique. Thus, for instance, one could first select areas in the input image and then proceed to search for corresponding areas in the mosaic image. The change image can then be used, in accordance with the invention, to determine what areas from the mosaic image are taken into consideration, so that one and the same area below a particular changeability is taken into consideration and above a particular changeability is not taken into consideration.

Also, areas from the mosaic image could be taken into consideration regardless of their changeability, after which a score for the difference between the content of the areas from the mosaic image and the input image is subsequently weighted depending on the changeability of the area in question in the mosaic image, so that the score indicates more difference according as the changeability is greater. It is thus rendered more likely that less changeable areas from the mosaic image are used in the choice of pairs of optimally corresponding areas.

The mosaic image, the change image and the input image are preferably stored such that from the location of a pixel in the image in question follows the address at which the content of that pixel is stored in the memory. Thus, the choice of a particular area in the images corresponds to a number of addresses in the memories from which the information about the image in question is retrieved. Also, a displacement vector corresponds to a translation of addresses in one memory to addresses in the other memory. Without deviating from the invention, however, the information on the images can also be stored in a different manner, for instance in compressed form without a fixed relation between pixel locations and addresses.

Although not further addressed hereinabove, compensation for rotation of the camera 10 is also possible. Preferably, this rotation for an input image is predicted from preceding input images and the input image, rotated through the predicted angle, is stored in the input memory 11. Thus, the effect of camera rotations is eliminated. Without deviating from the invention, however, this effect can also be eliminated by supplying image information from the selected areas in the mosaic image as rotated according to the predicted rotation to the search unit 13, or by incorporating this rotation in the search unit 13 itself It is even possible, during the search in the search unit 13, to search for a rotation between the areas from the input image and the mosaic image that leads to minimally deviating image content. After a translation and rotation has been determined, the mosaic image is updated in accordance with the rotation and translation found.

Further, different refinements are possible. Thus, in the fifth step 45, the input image or the mosaic image can, after a rough movement determination and comparison of the two images, be corrected for camera effects such as automatic gain control, before searching for corresponding areas in the two images again. Further, according as the camera moves further in one particular direction, it will be required each time to clear a part of the mosaic memory 12 that contains a part of the mosaic image 30 farthest removed from the input image, this to create space for a new background section coming into view. Furthermore, in addition to the change image, an 'age image' can be updated, indicating how long the information in the mosaic image has not been refreshed. Imagings of parts of the background that have long been covered by objects from the foreground of the scene will thus acquire a higher age value. In this way, too, the selection of the areas from the mosaic image 30 can be controlled, so that "older" areas are less likely to be used, since the chance that the background in such parts has changed is greater according as it has been covered longer.

It will further be clear that the change image is usable for other applications than determining movements alone. Thus, the change image can also be used for compression purposes or for position-dependent control of image filtering or other image processing operations.

A chief application, however, is the generation of an outgoing sequence of video images, each based on a next image from an incoming sequence of video images, but after elimination of the effect of shaking movements of the camera on the input images. Here, according to the invention, the magnitude, etc., of the shaking movements is determined on the basis of the movement detection described.

Techniques for generating such an outgoing sequence given a detected movement are known per se. For instance, in the incoming images, in each case a window is selected at a variable position within those incoming images. The window positions are selected such that, according to the calculated movement of the background, the selected window in different images each time contains the same section of background at substantially the same place with respect to the edges of the selected window. Optionally, a low pass filtered component of the movement is not compensated here.

The part of the incoming image in the selected window in each case forms an image in the outgoing sequence of images. To that end, the apparatus preferably includes an output unit coupled to the input memory and the processor, arranged for selecting, on the basis of an estimate of the movement of the background produced by the processor, a window for each input image and reading out image information from the input image in the window selected for that input image, for output as output image. In one embodiment, the window is only displaced depending on translations, but preferably the window is also rotated depending on the measured background rotation.

The invention claimed is:

1. A method for determining a movement of an imaging of a background in a sequence of images of a scene, which method comprises the steps of storing position-dependent image information coming from images from a part of the sequence;

selecting a correspondence between a first and second area from, respectively, an input image from the sequence and the image information, on the ground of agreement of an image content in the areas involved;

determining the movement from locations of the first and second area in, respectively, the input image and the image information, characterized in that the method comprises the steps of composing a combination image with pixels built up through combination of several images of the sequence;

determining a change image which indicates position-dependently to what extent there are differences between the image content of pixels from the sequence of images contributing to the same pixel in the combination image;

wherein selecting the correspondence is carried out depending on the change image, such that a probability that a candidate area is selected as second area in the correspondence is made less according as the change image indicates that the changeability of pixels in that candidate area is greater.

2. A method according to claim 1, wherein selecting the correspondence comprises the steps of selecting the second area from several candidate areas in the combination image, depending on a content of the change image for the candidate areas;

subsequently searching for the first area in the input image on the basis of the selected second area.

3. A method according to claim 1, wherein selecting the correspondence comprises the steps of successively selecting a provisional second area from several candidate areas in the combination image, depending on a content of the change image for the candidate areas;

searching for a provisional first area in the input image on the basis of the selected provisional second area, determining a provisional movement from a location of the provisional first area and provisional second area in, respectively, the input image and the image information;

selecting the second area from the candidate areas from the image information, at locations where a difference between the combination image and the input image after application of the provisional movement is below a threshold;

searching for the first area in the input image on the basis of the selected second area.

4. A method according to claim 1, wherein the combination image is updated on the basis of a content of the input image imaged on the combination image in accordance with the movement.

5. A method according to claim 4, wherein an extent to which the combination image is updated is set position-dependently, depending on the change image, such that less changeable parts of the combination image are updated less strongly than more changeable parts.

6. A method according to claim 1, wherein a sequence of output images are derived from the sequence of images, and wherein the determined movement is used to compensate a movement of a camera in the sequence of output images.

7. An image processing apparatus comprising an input for receiving a sequence of images of a scene;

a memory for storing position-dependent image information coming from images from a part of the sequence;

a selection unit for selecting a correspondence between a first and second area from, respectively, an input image from the sequence and the image information, on the ground of agreement of an image content in the areas concerned;

a movement determiner for determining the movement from the locations of the first and second area in, respectively, the input image and the image information, characterized in that the apparatus is provided with an image composition unit for composing a combination image with pixels which have been built up through combination of several images of the sequence;

a change determiner for determining a change image which indicates position-dependently to what extent there are differences between the image content of pixels from the sequence of images that contribute to the same pixel in the combination image;

wherein the selection unit performs the selection of the correspondence depending on the change image, such that a probability that a candidate area is selected as second area in the correspondence is made less according as the change image indicates that the changeability of pixels in the candidate area is greater.

8. An apparatus according to claim 7, wherein the selection unit further comprises:

means for selecting the second area from several candidate areas in the combination image, depending on a content of the change image for the candidate area;

a search unit for searching for the first area in the input image on the basis of the selected second area.

9. An apparatus according to claim 7, wherein the selection unit further comprises:

means for selecting the second area from several candidate areas in the combination image, depending on a content of the change image for the candidate area;

a search unit for searching for a first area in the input image on the basis of the selected provisional second area, the apparatus being arranged for first, with the means for selecting, selecting a provisional second area from candidate areas in the combination image and, with the search unit, searching for a provisional first area in the input image on the basis of the selected provisional second area, and determining a provisional movement with the provisional first and second area; and subsequently, with the means for selecting, selecting the second area from candidate areas in the combination image at locations where a difference between the combination image and the input image after application of the provisional movement differs less than a threshold and, with the search unit, searching for the first area in the input image on the basis of the selected second area.

10. An apparatus according to claim 7, further comprising an output unit for outputting a sequence of output images derived from the sequence of images, which output unit is arranged to use the determined movement for compensating an effect of a movement of a camera on the sequence of output images.

11. An apparatus according to claim 8, further comprising an output unit for outputting a sequence of output images derived from the sequence of images, which output unit is arranged to use the determined movement for compensating an effect of a movement of a camera on the sequence of output images.

12. An apparatus according to claim 9, further comprising an output unit for outputting a sequence of output images derived from the sequence of images, which output unit is arranged to use the determined movement for compensating an effect of a movement of a camera on the sequence of output images.

13. A method according to claim 2 wherein the combination image is updated on the basis of a content of the input image imaged on the combination image in accordance with the movement.

14. A method according to claim 3 wherein the combination image is updated on the basis of a content of the input image imaged on the combination image in accordance with the movement.

15. A method according to claim 2, wherein a sequence of output images are derived from the sequence of images, and wherein the determined movement is used to compensate a movement of a camera in the sequence of output images.

16. A method according to claim 3, wherein a sequence of output images are derived from the sequence of images, and wherein the determined movement is used to compensate a movement of a camera in the sequence of output images.

17. A method according to claim 4, wherein a sequence of output images are derived from the sequence of images, and wherein the determined movement is used to compensate a movement of a camera in the sequence of output images.

18. A method according to claim 5, wherein a sequence of output images are derived from the sequence of images, and wherein the determined movement is used to compensate a movement of a camera in the sequence of output images.

* * * * *